R. C. HIMMEL.
ROTARY CLEANER CARRIER.
APPLICATION FILED SEPT. 11, 1920.
1,390,438.
Patented Sept. 13, 1921.
2 SHEETS—SHEET 1.
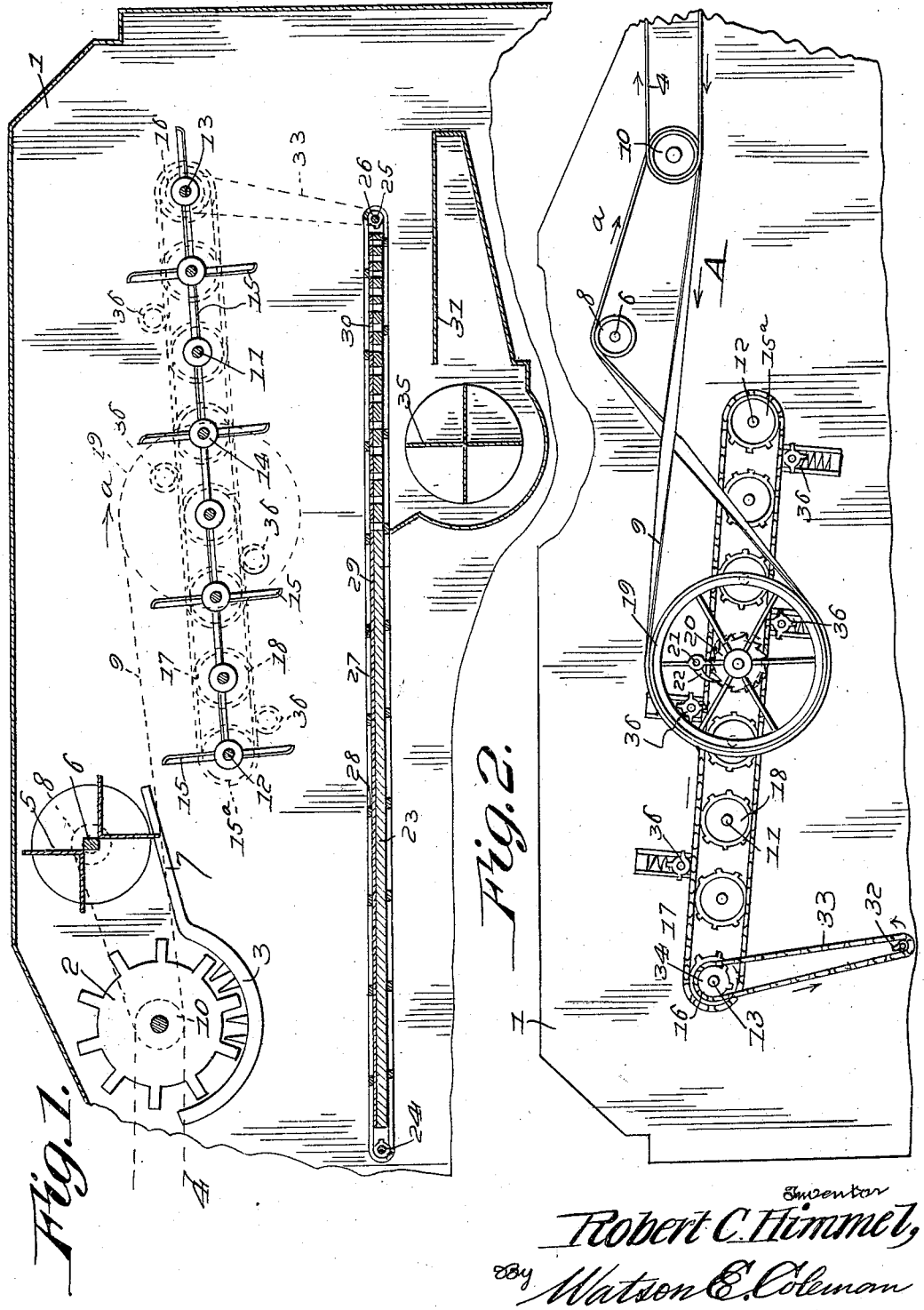
Inventor
Robert C. Himmel,
By Watson E. Coleman
Attorney R. C. HIMMEL.
ROTARY CLEANER CARRIER.
APPLICATION FILED SEPT. 11, 1920.
1,390,438.
Patented Sept. 13, 1921.
2 SHEETS—SHEET 2.
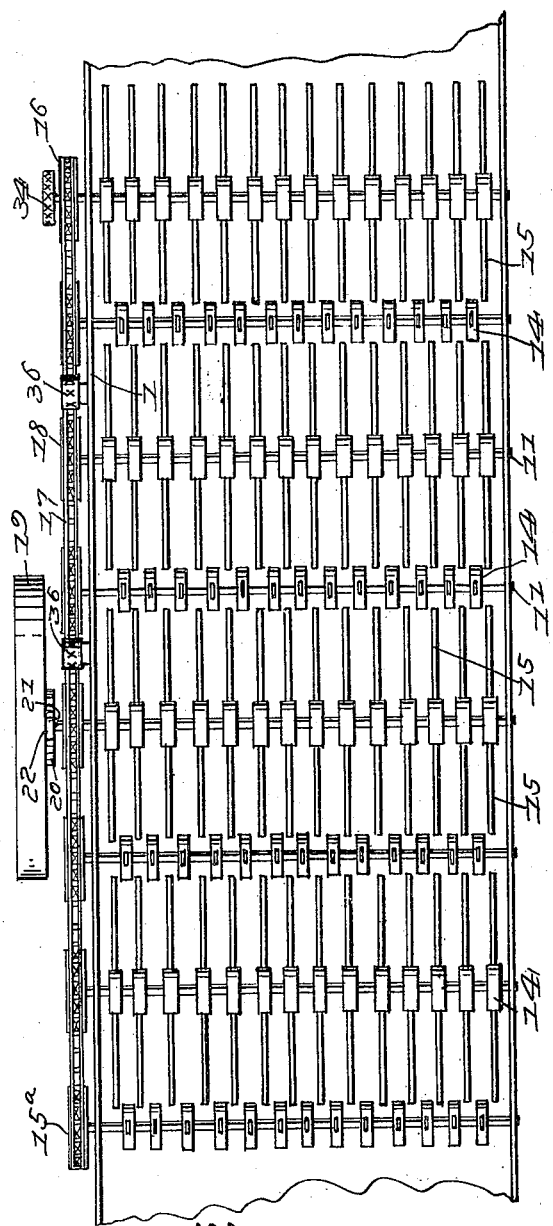
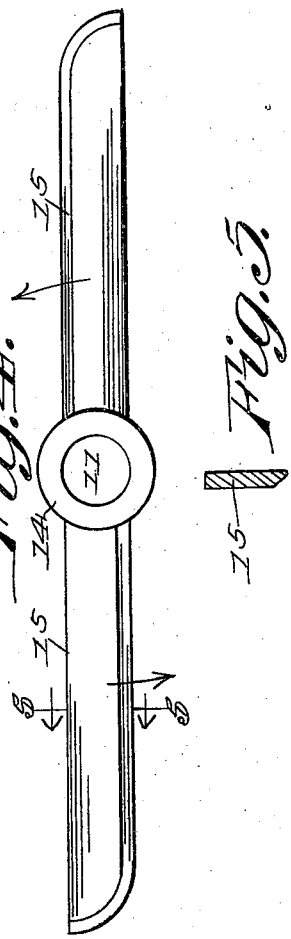

UNITED STATES PATENT OFFICE.

ROBERT C. HIMMEL, OF TOPEKA, ILLINOIS.

ROTARY CLEANER-CARRIER.

1,390,438.          Specification of Letters Patent.     Patented Sept. 13, 1921.

Application filed September 11, 1920. Serial No. 409,594.

*To all whom it may concern:*

Be it known that ROBERT C. HIMMEL, a citizen of the United States, residing at Topeka, in the county of Mason and State of Illinois, has invented certain new and useful Improvements in Rotary Cleaner-Carriers, of which the following is a specification, reference being had to the accompanying drawings.

The present rotary cleaner-carrier has for its object to provide improved means for continuously beating and turning the straw over, before a discharge into a blower.

A cleaner-carrier of this kind also contemplates distributing the straw over the carrier evenly, and at the same time keeping it in a uniform forward movement.

The present device further includes means comprising intermeshing blades arranged in series, each series being carried by a shaft or drum, and each blade of each series being beveled upon its forward moving edges to prevent knocking or throwing the loose grain, thereby facilitating the advancing of the straw to the blower.

Mainly this cleaner-carrier distinguishes from all other separators, in that it eliminates all up and down and side vibrations, or shaking movements, which are common in all present day separators, thereby economizing the power and prolonging the wear of the machine. This apparatus also embodies the strong point in the fact that it thoroughly completes the separation of the grain from the straw in the operation of the machine, continually turning the straw and beating it, and at the same time keeping it in a forward movement toward the blower. Also the present machine is compact, and in constructing a threshing machine embodying the present form of cleaner-carrier and a rotary grain pan as embodied in the co-pending application of R. C. Himmel, filed Sept. 11, 1920, Serial No. 409,595, the threshing machine may, by far, be constructed more compact, eliminating all the expensive and cumbersome lateral and up and down shaking devices, which consume considerable space in the construction.

Additionally the invention aims to time the various groups or series of blades, so that when one group of one series is substantially perpendicular, the group over an adjacent series is horizontal, thereby facilitating the transference of the straw from one series of blades to another, and so on until the straw is advanced to the blower.

Further invention finally aims to provide means employed in conjunction with the driving means for the cleaner-carrier for preventing retrograde movement of the cleaner-carrier, when the power is reversed.

While the design and construction at present illustrated and set forth is deemed preferable, it is obvious that as a result of reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a vertical sectional view through a threshing machine, showing the cleaner-carrier as applied and constructed in accordance with the invention, Fig. 2 is a view in side elevation of a portion of the casing 1, showing the driving mechanism for the cleaner-carrier, namely the cylinder 9 and the chain drive 17, Fig. 3 is a sectional plan view of the casing 1 showing the cleaner-carrier in plan, Fig. 4 is an enlarged detail view of one of the blades 15, and Fig. 5 is a sectional view on line 5—5 of Fig. 4.

Referring more especially to the drawings, 1 designates the casing of a portion of a threshing machine, and 2 denotes a conventional form of thresher cylinder, and 3 the concave, with which the cylinder coöperates. The cylinder 2 is designed to be operated by any suitable means, such as that as indicated at 4.

A beater 5 is carried by a shaft 6 mounted in bearings of the frame of the threshing machine and is positioned immediately above an extension 7 of the concave, thereby acting to advance the straw from the cylinder to the cleaner-carrier. The shaft 6 carries a pulley 8, and engaging thereabout is a belt 9, which in turn travels about and receives power from the pulley 10 of the shaft of the cylinder 2.

The cleaner-carrier comprises a plurality of shafts 11 and the end shafts 12 and 13, and mounted upon the shafts are the hubs 14, which carry the cleaner and carrier blades 15. It will be noted that these blades are so relatively disposed, that when the cleaner-carrier is in operation, certain of the blades will assume substantially a vertical position, and other of the blades will assume horizontal positions. In other words, the blades are arranged so that at all times the spaces between the shafts are protected, so as to prevent the straw from falling through, and at the same time transfer the straw from the different groups of blades. For example the collars are splined or otherwise fixed upon the shafts, and arranged so that the blades of each shaft will be in groups, the blades being in parallelism and alined transversely. The collars are so arranged upon the shaft so that the blades will be in series, and each series will consist of more than one group, for instance two groups, although it is obvious that many other groups may be provided. Furthermore, the number of shafts may be increased or decreased, it depending, of course, as to the size of the interior of the casing of the separator of a threshing machine, and also depending upon the length of the blades.

Each blade is designed to be constructed of hard wood, substantially two feet more or less in length, and is beveled upon its forward moving edge to prevent knocking or throwing the loose grain. The beveled edges of the blades act to break the straw, in order to facilitate the feeding of the straw through the machine, during the cleaning process. In other words the beveling of the blades cause edges to be formed, in order to snap or break the straw, without cutting the same. In fact should the blades be the same thickness throughout their length, the majority of the straw will be simply lifted from one set of blades to another, and would not tend to shake the straw very much, in order to insure a thorough cleaning. Furthermore should the blades be made of uniform thickness throughout, the straw would be whipped or lifted from one set to another. However by providing the beveled edges, the majority of the straw is broken, not cut, owing to the blades being made of wood, and in view of this the cleaning of the straw is greatly facilitated. Also it will be noted that when one set of blades lift the straw, toward an adjacent set, the blades of the adjacent set or group act to more or less slide the straw from the first set. This is particularly true owing to the ends of the blades being curved or rounded off, as well as being beveled, and even though the blades may be constructed of metal, the idea of one set of the blades sliding the straw from an adjacent set, during the rotation of the groups of blades, the straw is not very apt to be cut. Furthermore should the blades be made of metal, though they are to be made preferably of wood, the bevels of the blades will not be such as to provide cutting edges.

The shafts 12 and 13 carry sprockets $15^a$ and 16 over which a sprocket chain 17 engages. This sprocket chain also travels over the sprockets 18, which are carried by the intermediate transverse cleaner-carrier shafts 11, so that when power is transmitted to one of the shafts 11, movement will be imparted to the other shafts.

One of the shafts 11 is provided with a pulley 19, about which the belt 9 travels. One of the shafts 11 is provided with a ratchet 20 splined or otherwise fixed thereto, and pivotally mounted as at 21 on the sprocket 19 is a dog or pawl 22, which coöperates with the teeth of the ratchet 20. It will be noted that the sprocket 19 is loose upon one of the shafts 11, while the ratchet 20 is fixed thereon, hence when movement is imparted to the belt 9, moving pulley 19 in the direction of the arrow $a$, the pawl or dog 22 will engage the teeth of the ratchet and impart movement to one of the shafts 11. Since the sprocket chain 17 engages the sprockets 18, which are carried by the shafts 11 and about the sprockets 15 and 16, movement will be imparted to the various shafts, and hence cause movement of the blades, which will intermesh in the manner previously stated for the purpose of advancing the straw to the blower.

Arranged below the cleaner-carrier is what may be termed a rotary grain pan 23, which comprises the shafts 24 and 25, which carry the sprocket 26. Engaged about the sprockets are sprocket chains 27, which are cross-connected by the rods or bars 28. These rods or bars travel close to and over a suitable metallic covered floor 29. This floor is covered with any suitable sheet metal, preferably sheet iron or the like and a rear portion of this floor, substantially one-third of it, is provided with perforations 30, through which the grain passes as the bars or rods move over the surface of the floor. The material passing through the perforations drops upon a plate 31 in a relatively thin column, thereby permitting a better action of the air from the blower thereon. The shaft 25 has a sprocket 32, about which a sprocket chain 33 engages. The chain 33 in turn engages about a sprocket 34 on the shaft 13, so that when the cleaner carrier is put in motion, power is also transmitted to the rotary grain pan. One end of the rotary grain pan is disposed immediately over the blower, such as indicated at 35.

In the operation the cleaner-carrier receives the straw as it leaves the cylinder beater and racks continuing the procees of separating, at the same time turning the straw and giving it a forward movement, without any chance of escape, waste or choking until the separating of all grain is complete.

In order to hold the chain in mesh with the teeth of the sprocket, a plurality of chain tighteners 36 are provided. These chain tighteners are disposed above and below the upper and lower parts of the chain, so as to retain the chain in engagement with the teeth of the sprockets. In fact the chain tighteners act to prevent the chain from slipping from engagement with the teeth of the sprockets, thereby insuring the imparting movement to the shafts.

The invention having been set forth, what is claimed as new and useful is:

1. In a machine for the purpose indicated, a casing having a separator chamber, a threshing cylinder and beater in the forward part thereof and including means for driving the latter from the former, a rotary grain pan having its forward end under the cylinder and the beater with its remaining portion extending rearwardly to carry the grain from the cylinder to the rear, a cleaner-carrier with its forward end operable partially under the beater and having its remaining portion inclined slightly upwardly and extending rearward, said cleaner-carrier being disposed over the greater part of the rotary grain pan, said cleaner-carrier comprising a series of shafts arranged in parallelism, each shaft being disposed on a slightly increased higher plane toward the rear of the chamber thereby inclining the cleaner-carrier, cleaner carrier arms arranged in series of each shaft, each series comprising a plurality of groups, the arms adapted to intermesh, said arms being sharpened on certain of their edges in directions with the rotation of the shafts, the outer portions of the edges being rounded off, the sharpened edges extending over the rounded portions of the arms, means for driving the shafts simultaneously in the same direction, and means operatively connecting the shafts and the thresher and the beater for transmitting motion thereto, and means for operatively connecting between the carrier and the rotary grain pan.

2. In a machine for the purpose indicated, a casing having a separator chamber, a cleaner-carrier mounted therein comprising a plurality of rotating shafts in spaced parallelism, said shafts being disposed upon relatively increased higher planes to the rear of the casing, a series of arms carried by each shaft and comprising a plurality of groups, the arms of each group intermeshing with the arms of the groups of an adjacent series of arms, said arms having certain of their edges merging into rounded portions, at the ends of the arms and being sharpened in the direction of the rotation of the shafts, the sharpened edges extending over the rounded portions of the arms, and means for driving the shafts simultaneously.

In testimony whereof I hereunto affix my signature.

ROBERT C. HIMMEL.